(12) United States Patent
Lee et al.

(10) Patent No.: US 11,254,406 B2
(45) Date of Patent: Feb. 22, 2022

(54) MODULAR ELECTRIC PROPULSION DEVICE FOR SHIPS

(71) Applicant: VINSSEN CO., LTD, Jeollanam-do (KR)

(72) Inventors: Chil Han Lee, Gyeongsangnam-do (KR); Il Hyuk Sung, Jeju-do (KR); Heon Yong Seo, Busan (KR)

(73) Assignee: VINSSEN CO., LTD, Jeollanam-Do (KR)

( * ) Notice: Subject to any disclaimer, the term of this patent is extended or adjusted under 35 U.S.C. 154(b) by 0 days.

(21) Appl. No.: 17/000,734

(22) Filed: Aug. 24, 2020

(65) Prior Publication Data
US 2021/0061433 A1 Mar. 4, 2021

(30) Foreign Application Priority Data
Aug. 26, 2019 (KR) .................. 10-2019-0104565

(51) Int. Cl.
*B63H 21/17* (2006.01)
*B63H 21/38* (2006.01)

(52) U.S. Cl.
CPC .......... *B63H 21/17* (2013.01); *B63H 21/383* (2013.01)

(58) Field of Classification Search
CPC .............................. B63H 21/17; B63H 21/383
See application file for complete search history.

(56) References Cited

U.S. PATENT DOCUMENTS

| | | |
|---|---|---|
| 9,764,727 B1 | 9/2017 | Benavides et al. |
| 2011/0244740 A1* | 10/2011 | Daikoku ............. B63H 20/007 440/6 |
| 2013/0082550 A1 | 4/2013 | Fleming |
| 2018/0154780 A1* | 6/2018 | Daigle .................. B63H 21/17 |
| 2019/0023369 A1* | 1/2019 | Gjerpe ................. B60L 3/0061 |
| 2019/0176951 A1* | 6/2019 | Ulliman ................ B63H 21/17 |

FOREIGN PATENT DOCUMENTS

| | | |
|---|---|---|
| JP | 2010-0228530 A | 10/2010 |
| JP | 2010-228558 A | 10/2010 |
| KR | WO 2012-089845 A2 | 7/2012 |
| KR | 10-2017-0029878 A | 3/2017 |
| KR | 10-2017-0117764 A | 10/2017 |
| KR | 10-2018-0065041 A | 6/2018 |

OTHER PUBLICATIONS

International Search Report for PCT/KR2020/010844 dated Jan. 5, 2021.
European Search Report For EP 20192040.2 dated Feb. 12, 2021 from European patent office in a counterpart European patent application.

* cited by examiner

*Primary Examiner* — Stephen P Avila
(74) *Attorney, Agent, or Firm* — The PL Law Group, PLLC

(57) ABSTRACT

A modular electric propulsion device for ships according to an embodiment of the present disclosure may be easily mounted in a ship after removing an existing engine from the ship because a switch board for power distribution, and an inverter and a motor for power conversion are modularized inside a single casing, and may be installed in a minimum space for installation because a distance between motor rotation shafts may be made close to each other even when two modular electric propulsion devices for ships are mounted in a dual installation manner.

9 Claims, 7 Drawing Sheets

MODULAR ELECTRIC PROPULSION DEVICE FOR SHIPS

CROSS REFERENCE TO RELATED APPLICATION

The present application claims priority to Korean Patent Application No. 10-2019-0104565, filed Aug. 26, 2019, the entire contents of which is incorporated herein for all purposes by this reference.

BACKGROUND

Field of the Invention

The present invention relates to an electric propulsion device for ships and, more particularly, to a modular electric propulsion device for ships, wherein a switch board for power distribution, and an inverter and a motor for power conversion are modularized inside a single casing, thereby being easily installed in a ship after removing an existing engine from the ship; and the distance between motor rotation shafts may be made close to each other even when the two devices are mounted together in a dual installation manner, thereby occupying a minimum space for installation.

Description of the Related Art

Environmental regulations have been tightened to reduce greenhouse gas and air pollutant emissions worldwide, and various measures are being prepared accordingly. In addition, there is a growing need for an effective and reasonable method of saving energy along with minimizing environmental pollution.

As the regulations on greenhouse gas emissions become effective by the United Nations Framework Convention on Climate Change, the International Maritime Organization has enacted regulations on marine environmental damage factors caused by ships, and accordingly, the goal of reducing greenhouse gas emissions by 30% compared to that of the present, by year 2025, will be enforced. In addition, in Chapter 6 of Annex VI to the International Convention for the Prevention of Marine Pollution from Ships, regulations on the emission of nitrogen oxides and sulfur oxides are strengthened, whereby the need for the effective and reasonable method of saving energy is gradually increasing.

In the case of ships, a diesel electric propulsion system has been developed, and recently, a new concept of electric propulsion method through eco-friendly power generation such as fuel cells has been studied.

FIG. 1 is a view showing a conceptual diagram of an electric propulsion ship.

Referring to FIG. 1, an electric propulsion ship 10 includes: a battery 11 that stores power; an inverter 12 that converts the power of the battery 11; a motor 13 that rotates with power output from the inverter 12; and a driving propeller 14 that generates a driving force by connecting to the motor 13.

That is, the electric propulsion ship 10 generates driving force with an electric motor, thereby having an advantage of being eco-friendly, but since the battery 11, the inverter 12, and the motor 13 should be respectively installed and connected to each other with connection wiring 15, the installation is difficult for unskilled workers, and the installation after removing an existing engine from the ship is unreasonable because the area for installation becomes large.

In addition, in the case where motors 13 and 13a are installed in dual, more complicated connection wiring and the like causes a difficulty in the installation work.

SUMMARY

The present invention has been devised to solve the above-described problems, and an objective of the present invention is to provide a modular electric propulsion device for ships that may be easily installed in a ship by way of modularizing a switch board, an inverter, and a motor inside a single casing, after removing an existing engine from the ship.

In addition, another objective of the present invention is to provide a modular electric propulsion device for ships in which a switch board, an inverter, and a motor are positioned inside a single casing and connected to each other by a busbar to be electrically connected without complicated wiring.

In addition, a further objective of the present invention is to provide a modular electric propulsion device for ships capable of preventing occurrence of electrical accidents by insulating the casing, the switch board, the inverter, and the motor with each other.

In addition, still another objective of the present invention is to provide a modular electric propulsion device for ships capable of preventing a malfunction, generated due to incorrect connection of the connector, by means of differentiating the standards or the shapes of a power supply connector for supplying power and a communication connector for communication.

In addition, still another objective of the present invention is to provide a modular electric propulsion device for ships that may be realized in a compact size by way of making motor rotation shafts to be close to each other as much as possible even when the two motors are mounted in a dual installation manner.

In addition, still another objective of the present invention is to provide a modular electric propulsion device for ships capable of improving efficiency of operation through cooling the inverters and the motors appropriately.

In order to achieve the above objectives, the present invention provides a modular electric propulsion device for ships, the device including: a casing; a space partition plate provided inside the casing and dividing an inner space of the casing into a plurality of different spaces; a switch board fixed to the space partition plate in a first space and receiving and distributing external power, and separately outputting the power as power to be supplied to an inverter and power to be supplied to loads of a hull; the inverter fixed to the space partition plate in a second space among the spaces such that the inverter is spaced apart from the switch board, the inverter being configured to convert and output the power supplied from the switch board; and a motor which is fixed in a third space among the spaces such that the motor is spaced apart from the switch board and the inverter, the motor being configured to generate driving force by receiving the power from the inverter, wherein no engine is provided inside the casing, only the motor is provided as a single power source, and a rotation shaft of the motor protrudes directly from a front surface which is a surface facing a rear of the hull among surfaces of the casing.

In an exemplary embodiment, the inverter and the switch board are spaced apart from the casing, and the inverter and the switch board are insulated from the space partition plate.

In the exemplary embodiment, the third space may be provided with a motor support plate for fixing the motor while spacing the motor apart from the casing, and the motor and the motor support plate may be insulated from each other.

In the exemplary embodiment, the switch board and the inverter may be connected by a busbar, and the inverter and the motor may be connected by a busbar.

In the exemplary embodiment, the casing may be provided with a power supply connector for supplying the power by being connected to a cable gland of the switch board and a communication connector for communicating with the switch board, the inverter, or the motor; and the power supply connector and the communication connector may have standards or shapes different from each other.

In the exemplary embodiment, the casing may be provided with a cooling water supply nozzle receiving external cooling water to branch and supply the cooling water to the inverter and the motor, and a cooling water discharge nozzle combining the cooling water returned from the inverter and from the motor to discharge the combined cooling water to the outside.

In the exemplary embodiment, the rotation shaft of the motor may protrude from the front surface of the casing, but may be eccentric from a center of the front surface of the casing.

In the exemplary embodiment, the rotation shaft of the motor may be positioned at a lateral side of a lower part by being eccentric from the center of the front surface of the casing.

In addition, the present invention may further provide a ship including: the modular electric propulsion device for ships which is mounted on the ship, the ship using no internal combustion engine.

The present invention has the following excellent effects.

According to the modular electric propulsion device for ships of the present invention, there is an advantage in that the switch board, the inverter, and the motor are modularized inside a single casing, thereby being easily installed in a ship after removing an existing engine from the ship.

In addition, according to the modular electric propulsion device for ships of the present invention, there is another advantage in that the switch board, the inverter, and the motor are positioned inside the single casing and connected to each other by a busbar, thereby being easily connected electrically without using a complicated wiring.

In addition, according to the modular electric propulsion device for ships of the present invention, there is a further advantage in that the casing and the switch board, and the inverter and the motor are respectively positioned in different spaces and insulated from each other through insulating pads, thereby preventing electrical accidents such as electric shock.

In addition, according to the modular electric propulsion device for ships of the present invention, the standards or the shapes of the power supply connector for supplying power and the communication connector for communication are made to be different from each other, thereby preventing a malfunction that may be generated due to incorrect connection of the connector.

In addition, according to the modular electric propulsion device for ships of the present invention, there is another advantage in that the compact size of the modular electric propulsion device may be realized by way of making motor rotation shafts to be close to each other as much as possible even when the two motors are mounted in a dual installation manner because each of the motor rotation shafts is eccentric from the center of the front surface of the casing.

In addition, according to the modular electric propulsion device for ships of the present invention, there is another advantage in that the efficiency of operation may be improved by cooling the inverters and the motors appropriately by using cooling water.

DETAILED DESCRIPTION

Figure 1:
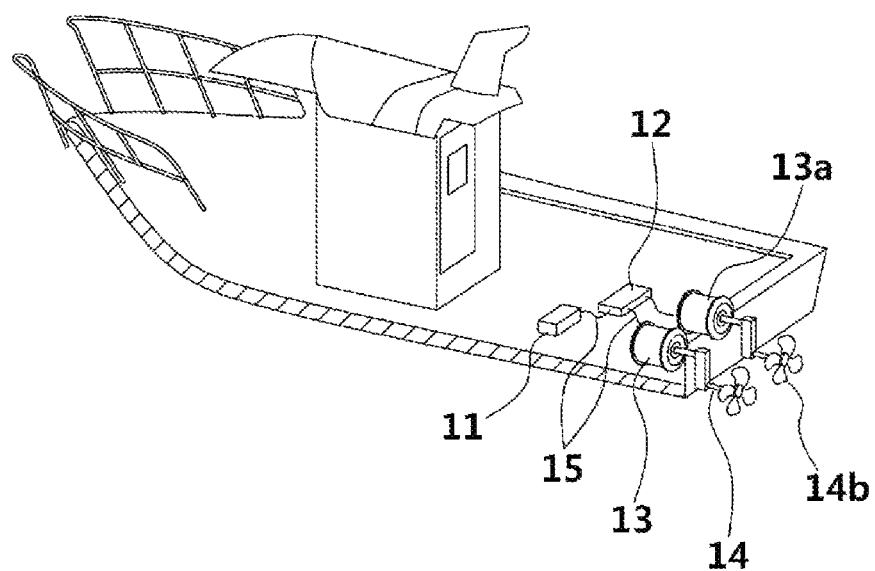
FIG. 1 is a view showing a conceptual diagram of an electric propulsion ship.

The terms used in the present invention have been selected from general terms that are as currently and widely used as possible, but in certain cases, there may be terms that are arbitrarily selected by the applicant. In these cases, the meaning should be interpreted by taking into considering the meanings of the terms described or used in the detailed description of the present invention, rather than just by using the names of terms.

Hereinafter, the technical configuration of the present invention will be described in detail with reference to exemplary embodiments illustrated in the accompanying drawings.

However, the present invention is not limited to the exemplary embodiments described herein, and may be embodied in other forms. The same reference numerals throughout the specification indicate the same components.

Figure 2:
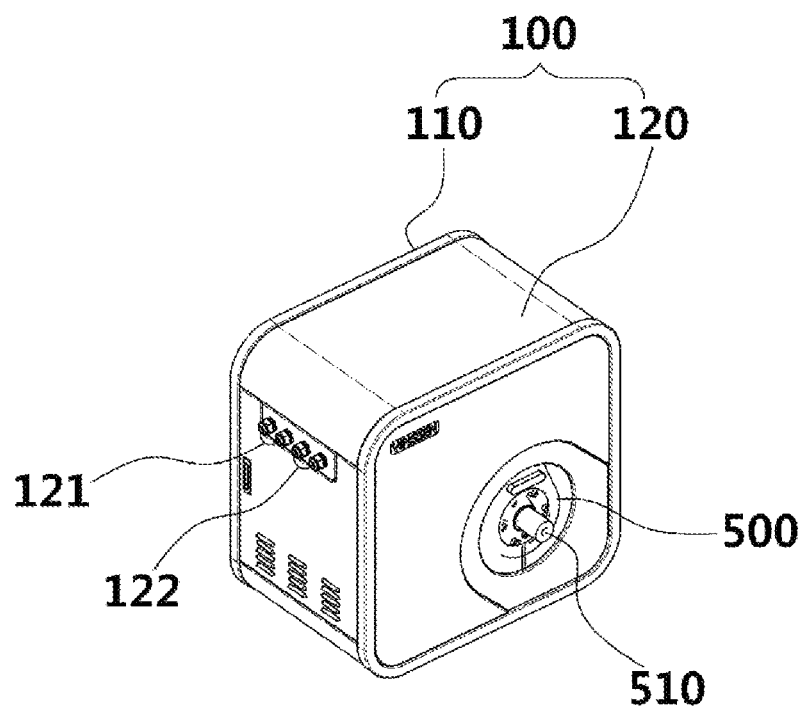
FIG. 2 is a perspective view showing a modular propulsion device for ships according to an exemplary embodiment of the present invention.
Figure 3:
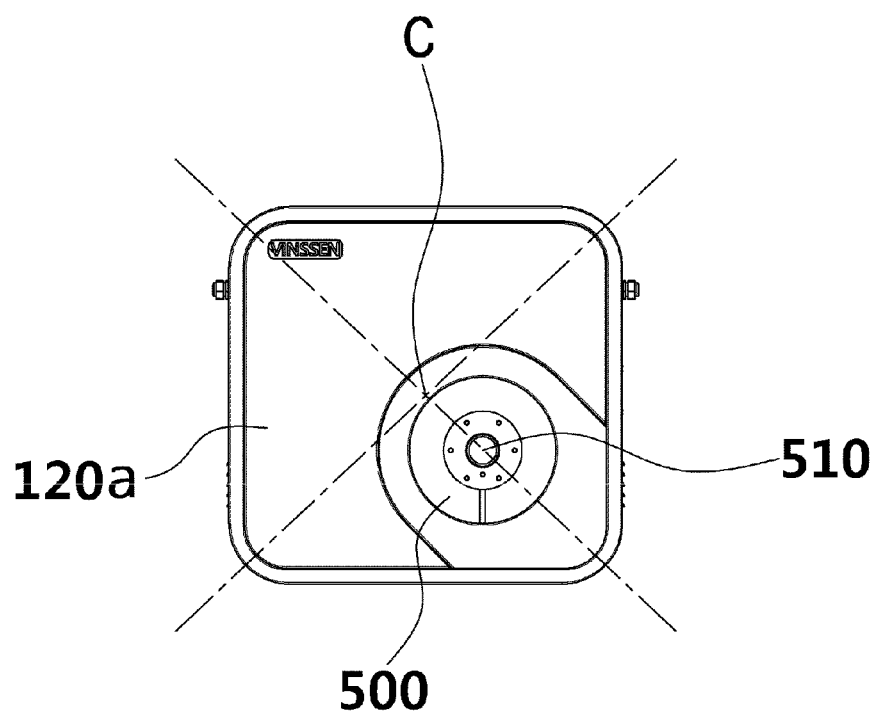
FIG. 3 is a front view showing the modular propulsion device for ships according to the exemplary embodiment of the present invention.
Figure 4:
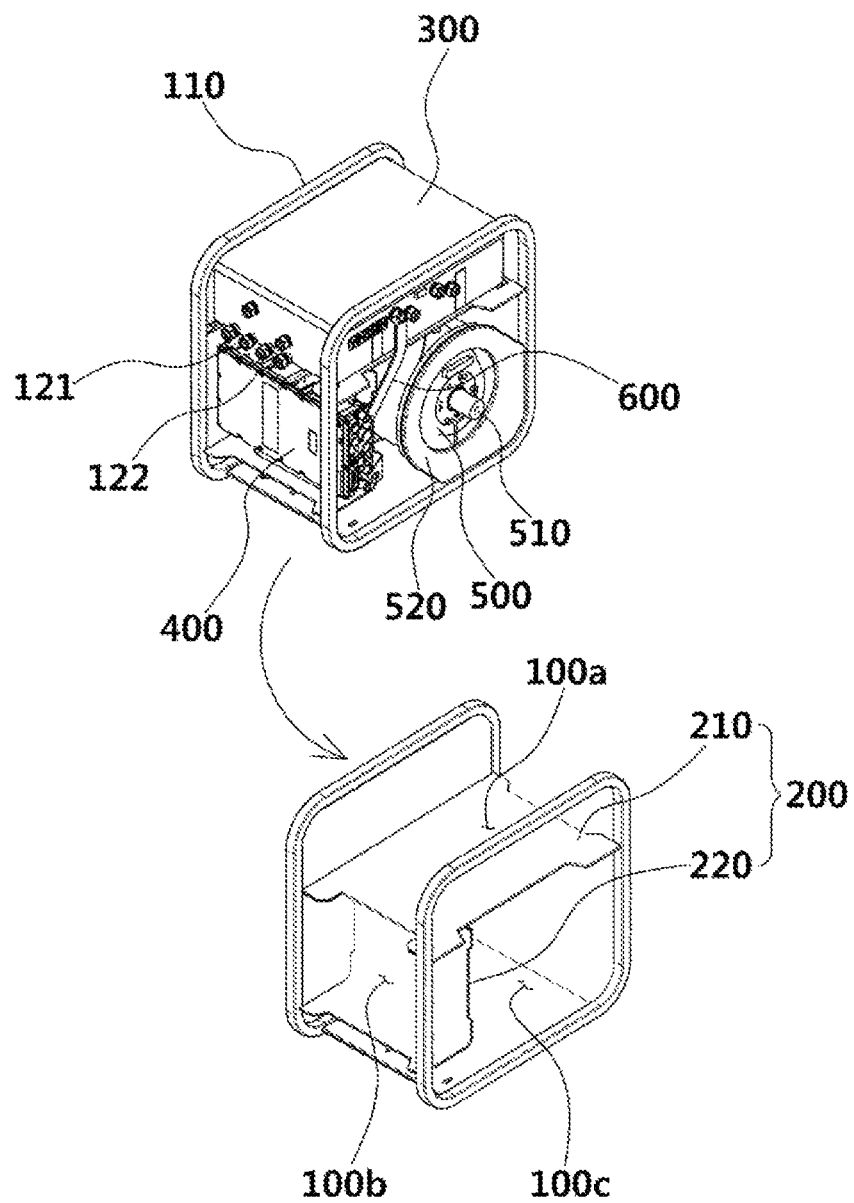
FIG. 4 is a front perspective view showing an interior of the modular propulsion device for ships according to the exemplary embodiment of the present invention.
Figure 5:
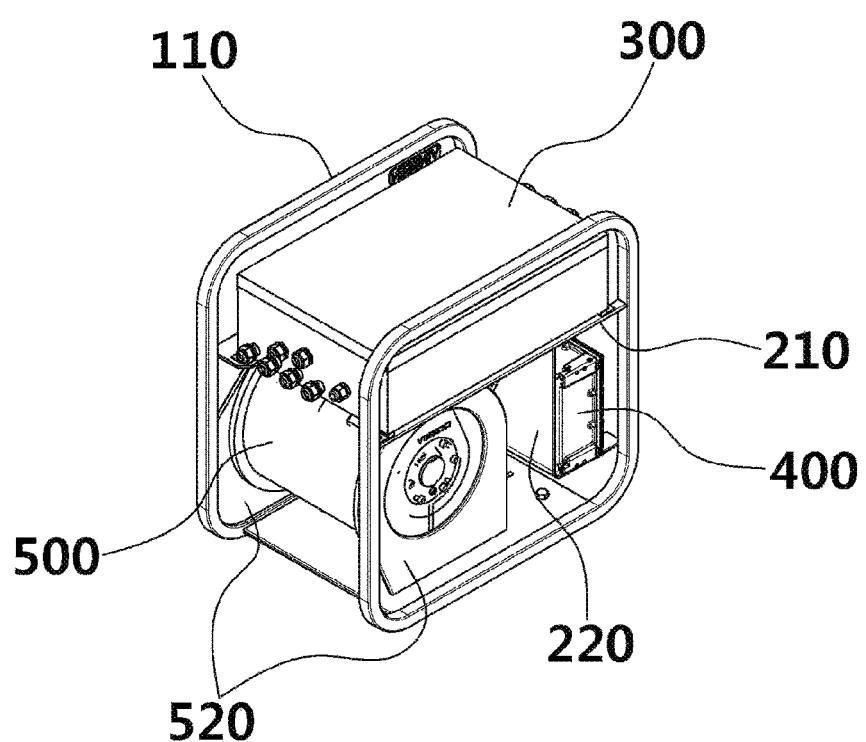
FIG. 5 is a rear perspective view showing the interior of the modular propulsion device for ships according to the exemplary embodiment of the present invention.

FIG. 2 is a perspective view showing a modular propulsion device for ships according to an exemplary embodiment of the present invention, FIG. 3 is a front view showing the modular propulsion device for ships according to the exemplary embodiment of the present invention, FIG. 4 is a front perspective view showing an interior of the modular propulsion device for ships according to the exemplary embodiment of the present invention, and FIG. 5 is a rear perspective view showing the interior of the modular propulsion device for ships according to the exemplary embodiment of the present invention.

Referring to FIGS. 2 to 5, the modular propulsion device for ships according to the exemplary embodiment of the present invention includes: a casing 100; a space partition plate 200; a switch board 300; an inverter 400; and a motor 500.

The casing 100 is manufactured in a substantially hexahedral shape by covering the cover 120 on the frame 110, and an accommodation space is provided therein so that the space partition plate 200, the switch board 300, the inverter 400, and the motor 500 may be accommodated therein.

However, the casing 100 is not limited to the hexahedral shape, as long as it is possible for the casing 100 to accommodate the space partition plate 200, the switch board 300, the inverter 400, and the motor 500 therein.

Preferably, the casing 100 has a hexahedron shape, in which the front surface thereof facing the stern of the ship is manufactured in a substantially rectangular shape.

The space partition plate 200 is a plate partitioning the inside of the casing 100 into a plurality of different spaces.

In detail, the space partition plate 200 divides the inner space of the casing 100 into a first space 100a, a second space 100b, and a third space 100c.

In addition, the space partition plate 200 is provided to include a first space partition plate 210 which divides the inner space of the casing 100 into an upper space and a lower space, and a second space partition plate 220 which divides the lower space into a left side space and a right side space.

In addition, the upper space is provided as the first space 100a, and when viewed from the front of the casing 100, the left side space is provided as the second space 100b, and the right side space is provided as the third space 100c.

In addition, the space partition plate 200 may allow the switch board 300, the inverter 400, and the motor 500 to be accommodated in each of the different spaces in the casing 100.

The switch board 300 is attached to the upper surface of the first space partition plate 210, thereby being positioned in the first space 100a.

In addition, the switch board 300 distributes and outputs external power supplied from the outside.

In addition, the switch board 300 separately outputs the external power as power to be supplied to the inverter 400 to be described below and power to be supplied to loads of the hull (i.e., steering gear, display, lighting, etc.).

In addition, the switch board 300 is fixed spaced apart from the casing 100, and is insulated from the first space partition plate 210 through an insulating pad.

The inverter 400 is attached to the second space partition plate 220, and is positioned in the second space 100b.

In addition, the inverter 400 is spaced apart from the casing 100, and is insulated from the second space partition plate 200 through an insulating pad.

In addition, the inverter 400 is also spaced apart from the switch board 300.

In addition, the inverter 400 is supplied with the power from the switch board 300 to convert into power having predetermined values of voltage and current, and supplies the power to the motor 500 to be described below.

In addition, the inverter 400 is electrically connected to the switch board 300 through a busbar 600.

The motor 500 is fixed spaced apart from each of the casing 100, the switch board 300, and the inverter 400 in the third space 100c.

In addition, the motor 500 is connected to the inverter 400 by a busbar to be supplied with power and generate driving force.

In addition, a rotation shaft 510 of the motor 500 is connected to a screw or a water jet to enable a ship to propel.

In addition, the motor 500 is fixed spaced apart from the casing 100 in the third space 100c through a motor support plate 520, and is provided with an insulating pad between the motor 500 and the motor support plate 520, so as to electrically insulate the motor 500 and the motor support plate 520 from each other.

Therefore, the modular propulsion device for ships of the present invention is provided as a modular device by accommodating the switch board 300, the inverter 400, and the motor 500 inside a single casing, thereby being installed in place after simply removing the existing engine without performing complicated wiring work.

In addition, the switch board 300, the inverter 400, and the motor 500 are each electrically insulated from the casing 100, so that there is an advantage in that a risk of electric shock or a malfunction generated through moisture may be reduced.

Meanwhile, the casing 100 is provided with a power supply connector 121 electrically connected to a cable gland 310 of the switch board 300 and capable of receiving external power, and a communication connector 122 for transmitting and receiving communication data by connecting with the inverter 400 or the motor 500.

In addition, the power supply connector 121 and the communication connector 122 have the standards or the shapes different from each other, so that the power line and the communication line cannot be misunderstood and connected to each other, so that even an inexperienced person may be able to properly perform the installation.

For example, the power supply connector 121 is in a circular shape and the communication connector 122 is manufactured in a polygonal shape, thereby being distinguished from each other.

Meanwhile, the rotation shaft 510 of the motor 500 is positioned in the longitudinal direction, not in the width direction of the hull, and protrudes directly from a front surface 120a of the casing 100; and the rotation shaft 510 may protrude eccentrically from the center c of the front surface 120a of the casing 100.

In detail, the rotation shaft 510 is positioned eccentrically at the lateral side of a lower part from the center c.

Figure 6:
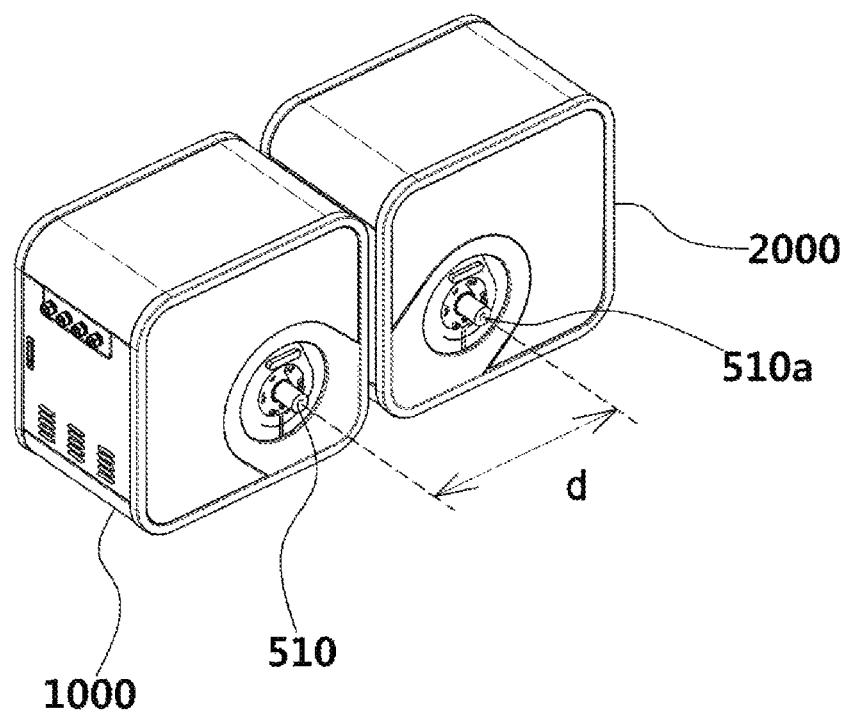
FIG. 6 is a view showing a dual installation of the modular propulsion device for ships according to the exemplary embodiment of the present invention.

For this reason, as shown in FIG. 6, when two modular propulsion devices for ships 1000 and 2000 of the present invention are installed to configure a dual installation, there may occur a problem in that the distance d between the rotating shafts 510 and 510a increases due to the volume of the casing 100, but in this regard, the distance d of the rotation shafts 510 and 510a are made to be as close as possible, whereby the modular propulsion devices for ships may be fastened to the screws or waterjets which are adjacent to each other, even though the dual installation is configured.

In addition, among the modular propulsion devices for ships 1000 and 2000, in one device 1000, the rotation shaft 510 is eccentric to the right side of the lower part, and in the other device 2000, the rotation shaft 510a is to be eccentric to the left side of the lower part.

Figure 7:
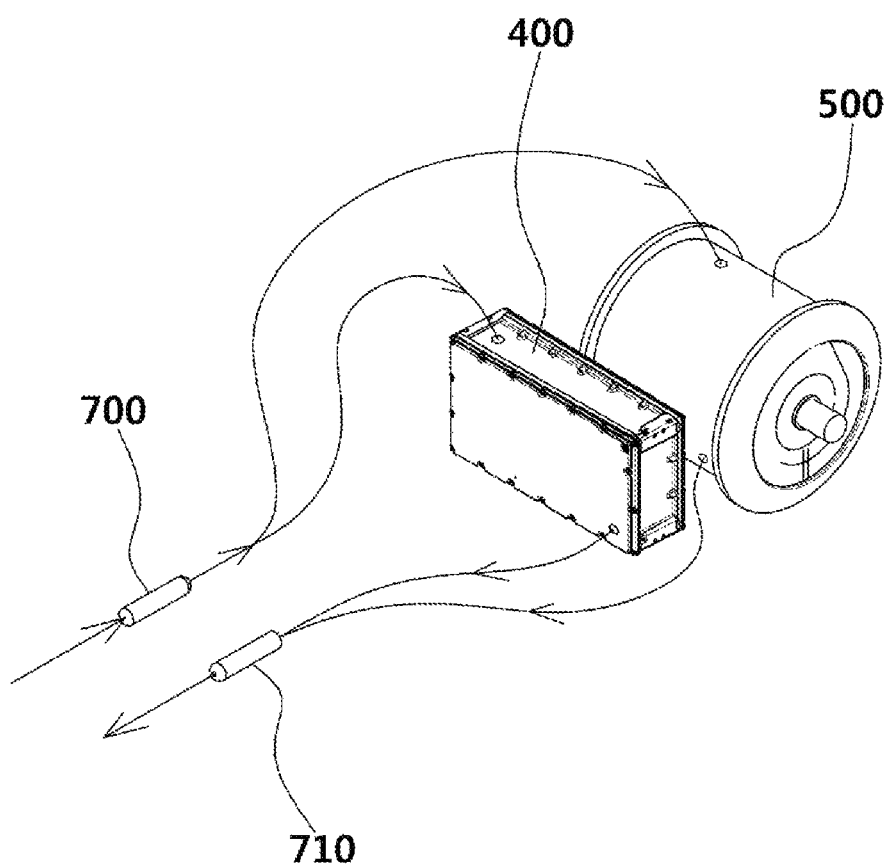
FIG. 7 is a view showing supply and discharge of cooling water of the modular propulsion device for ships according to the exemplary embodiment of the present invention.

In addition, referring to FIG. 7, the casing 100 is provided with a cooling water supply nozzle 700 for supplying cooling water to the inverter 400 and the motor 500 and a cooling water discharge nozzle 710 for discharging the cooling water returned from the inverter 400 and the motor 500.

In addition, the cooling water supply nozzle 700 branches the input cooling water to respectively supply to the inverter 400 and the motor 500, and the cooling water discharge nozzle 710 combines the cooling water returned from the inverter 400 and from the motor 500 to discharge the combined cooling water to the outside.

That is, since cooling water at a predetermined temperature is supplied to each of the inverter 400 and the motor 500, there is an advantage in that cooling efficiency may be increased and temperature management is easy.

In addition, the modular electric propulsion device for ships of the present invention may be provided as a finished form of a ship, the device being mounted on the hull of the ship, and in this case, the ship is not equipped with an internal combustion engine.

As described above, the present invention has been illustrated and described with reference to exemplary embodiments, but is not limited to the above-described exemplary embodiments, and various changes and modifications can be embodied by those skilled in the art to which the present invention belongs without departing from the spirit of the present invention.

A modular electric propulsion device for ships of the present invention may be industrially applicable in an eco-friendly ship using no fossil fuel, by means of mounting the device after removing an internal combustion engine from an existing ship.

What is claimed is:

1. A modular electric propulsion device for ships, the device comprising:
   a casing;
   a space partition plate provided inside the casing and dividing an inner space of the casing into a plurality of different spaces;
   a switch board fixed to the space partition plate in a first space and receiving and distributing external power, and separately outputting the power as power to be supplied to an inverter and power to be supplied to loads of a hull;
   the inverter fixed to the space partition plate in a second space among the spaces such that the inverter is spaced apart from the switch board, the inverter being configured to convert and output the power supplied from the switch board; and
   a motor which is fixed in a third space among the spaces such that the motor is spaced apart from the switch board and the inverter, the motor being configured to generate driving force by receiving the power from the inverter,
   wherein no engine is provided inside the casing,
   only the motor is provided as a single power source, and
   a rotation shaft of the motor protrudes directly from a front surface which is a surface facing a rear of the hull among surfaces of the casing.

2. The modular electric propulsion device of claim 1, wherein the inverter and the switch board are spaced apart from the casing; and
   the inverter and the switch board are insulated from the space partition plate.

3. The modular electric propulsion device of claim 2, wherein the third space is provided with a motor support plate for fixing the motor while spacing the motor apart from the casing; and
   the motor and the motor support plate are insulated from each other.

4. The modular electric propulsion device of claim 1, wherein the switch board and the inverter are connected by a busbar; and
   the inverter and the motor are connected by a busbar.

5. The modular electric propulsion device of claim 1, wherein the casing is provided with a power supply connector for supplying the power by being connected to a cable gland of the switch board and a communication connector for communicating with the switch board, the inverter, or the motor; and
   the power supply connector and the communication connector have standards or shapes different from each other.

6. The modular electric propulsion device of claim 1, wherein the casing is provided with a cooling water supply nozzle receiving external cooling water to branch and supply the cooling water to the inverter and the motor, and a cooling water discharge nozzle combining the cooling water returned from the inverter and from the motor to discharge the combined cooling water to the outside.

7. The modular electric propulsion device of claim 1, wherein the rotation shaft of the motor protrudes from the front surface of the casing, but is eccentric from a center of the front surface of the casing.

8. The modular electric propulsion device of claim 7, wherein the rotation shaft of the motor is positioned at a lateral side of a lower part by being eccentric from the center of the front surface of the casing.

9. A ship comprising the modular electric propulsion device of claim 1 which is mounted on the ship, the ship using no internal combustion engine.

* * * * *